US009008609B2

(12) United States Patent
Oh

(10) Patent No.: US 9,008,609 B2
(45) Date of Patent: Apr. 14, 2015

(54) USAGE RECOMMENDATION FOR MOBILE DEVICE

(75) Inventor: Hyun Oh Oh, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 83 days.

(21) Appl. No.: 13/503,813

(22) PCT Filed: Aug. 12, 2011

(86) PCT No.: PCT/US2011/047639
§ 371 (c)(1),
(2), (4) Date: Apr. 24, 2012

(87) PCT Pub. No.: WO2013/025190
PCT Pub. Date: Feb. 21, 2013

(65) Prior Publication Data
US 2013/0040601 A1    Feb. 14, 2013

(51) Int. Cl.
H04W 24/00    (2009.01)
H04M 1/725    (2006.01)

(52) U.S. Cl.
CPC ...... *H04M 1/72519* (2013.01); *H04M 2250/12* (2013.01); *H04M 2250/52* (2013.01); *H04M 2250/60* (2013.01)

(58) Field of Classification Search
CPC ..... H04M 15/00; H04M 17/10; H04W 24/00; H04W 4/24; H04W 8/20; H04W 8/26
USPC ........................ 455/405, 418, 425, 550.1, 566
See application file for complete search history.

(56) References Cited

U.S. PATENT DOCUMENTS

| | | | |
|---|---|---|---|
| 7,274,375 B1 | 9/2007 | David | |
| 2004/0121795 A1 | 6/2004 | Shih et al. | |
| 2004/0198415 A1 | 10/2004 | Lin | |
| 2004/0203720 A1 | 10/2004 | Shih et al. | |
| 2009/0052703 A1 | 2/2009 | Hammershoi | |
| 2009/0060240 A1* | 3/2009 | Coughlan et al. | 381/314 |
| 2010/0056210 A1* | 3/2010 | Bychkov et al. | 455/556.1 |
| 2010/0191140 A1* | 7/2010 | Terada et al. | 600/544 |
| 2010/0203862 A1 | 8/2010 | Friedlander et al. | |
| 2010/0317332 A1 | 12/2010 | Bathiche et al. | |
| 2011/0281561 A1* | 11/2011 | Erb | 455/413 |
| 2012/0072206 A1* | 3/2012 | Tsuchinaga et al. | 704/201 |

FOREIGN PATENT DOCUMENTS

KR    1020050020954 A    3/2005

OTHER PUBLICATIONS

How to Protect Yourself from Cell Phone Radiation, by Larry West, published by About.com, on Apr. 9, 2011.*

(Continued)

*Primary Examiner* — Kashif Siddiqui
(74) *Attorney, Agent, or Firm* — Brundidge & Stanger, P.C.

(57) ABSTRACT

Technologies are generally described for usage recommendation for mobile device. In some examples, a method performed under control of a mobile device includes determining whether to recommend using a right ear or a left ear of a user of the mobile device based at least in part on usage information of the right ear and the left ear and notifying the determination of whether to use the right ear or the left ear to the user.

30 Claims, 10 Drawing Sheets

(56) References Cited

OTHER PUBLICATIONS

United States Patent and Trademark Office, International Search Report and Written Opinion of the International Searching Authority for PCT/US2011/047639, mailed on Feb. 2, 2012.

"Health Risk of Cell Radiation," EMF Safety and Health Cell phone Radiation, accessed at http://web.archive.org/web/20120407011244/http://www.emwatch.com/Cellphones.htm, accessed on Sep. 15, 2014, pp. 1-5.

* cited by examiner

USAGE RECOMMENDATION FOR MOBILE DEVICE

CROSS-REFERENCE TO RELATED APPLICATIONS

This Application is a U.S. National Stage Application under 35 USC § 371 claiming the benefit of International Application No. PCT/US2011/47639, filed Aug. 12, 2011.

BACKGROUND

The usages of mobile devices have experienced a phenomenal growth in the last few years. Heavy usage of a mobile device may damage a user's health. Especially, the mobile device may damage the user's ear or the user's brain. For example, sound from a speaker of the mobile device may damage the user's ear and radiation from the mobile device may damage the user's brain.

SUMMARY

In an example, a method performed under control of a mobile device may include determining whether to recommend using a right ear or a left ear of a user of the mobile device based at least in part on usage information of the right ear and the left ear, and notifying the determination of whether to use the right ear or the left ear to the user.

In an example, a usage recommendation component for a mobile device may include a determining unit configured to determine whether to recommend using a right ear or a left ear of a user of the mobile device based at least in part on usage information of the right ear and the left ear, and a notifying unit configured to notify the determination of whether to use the right ear or the left ear to the user.

In an example, a computer-readable storage medium may have stored thereon computer-executable instructions that, in response to execution, cause a usage recommendation component for a mobile device to perform operations including identifying an ear used for a call by the mobile device, determining whether to recommend using a right ear or a left ear of a user of the mobile device based at least in part on usage information of the right ear and the left ear, and notifying the determination of whether to use the right ear or the left ear to the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
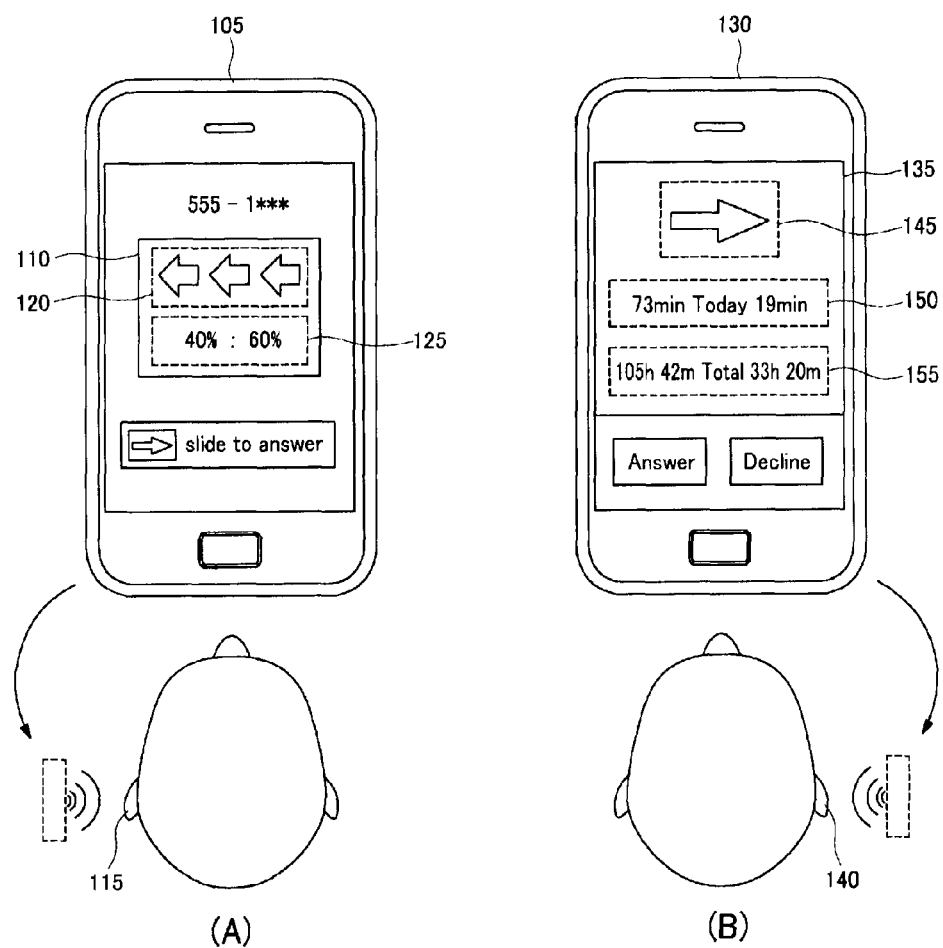
FIG. 1 shows an illustrative example in which a mobile device provides a user of the mobile device with information on a recommended usage direction for a call.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to usage recommendation for a mobile device.

Briefly stated, technologies are generally described for a usage recommendation system configured to provide a user of a mobile device with recommendation on a usage direction for a call. The recommendation may reduce a risk to the user's health occurred by using the mobile device. In some examples, the usage recommendation system may determine whether to recommend the user to use a right ear or a left ear based on usage information of the right ear and the left ear. By way of example, but not limitation, the usage information of the right ear and the left ear may include call times of the right ear and the left ear, respectively. The usage recommendation system may recommend the usage direction of mobile device to the user based on the call times.

In some examples, the usage recommendation system in the mobile device may identify an ear used for a call based on rotation of the mobile device, a pattern of an ear touching the mobile device and/or a captured image of the ear used for the call.

In some examples, the usage recommendation system may notify the user of information on a usage direction of the mobile device for a call. By way of example, but not limitation, the information may include an image presenting a direction for a call or call times of right ear and left ear. The user may use the mobile device for a call according to the presented direction.

FIG. 1 shows an illustrative example in which a mobile device provides a user of the mobile device with information on a recommended usage direction for a call in accordance with at least some embodiments of the present disclosure.

As depicted in FIG. 1(A), if a mobile device 105 receives a call request, mobile device 105 may provide a user 115 with an information image 110. In some embodiments, information image 110 may include recommended direction information 120 for a call. In some embodiments, information image 110 may also include call time information 125. By way of example, but not limitation, call time information 125 may indicate a ratio between a call time of a right ear and a call time of a left ear of user 115. In some embodiments, direction information 120 may present a usage direction of mobile device 105 selected by a usage recommendation component included in mobile device 105. User 115 may call using mobile device 105 with an ear, for example a left ear, corresponding to a usage direction that direction information 120 presents.

As depicted in FIG. 1(B), if a mobile device 130 receives a call request, mobile device 130 may provide a user 140 with an information image 135. Information image 135 may include recommended direction information 145, first call time information 150 and second call time information 155. In some embodiments, direction information 145 may present a usage direction of mobile device 130 selected by a usage recommendation component included in mobile device 130 on a display screen of mobile device 130. In some embodiments, first call time information 150 and second call time information 155 may include call times of a right ear and a left ear of at least one user who calls using mobile device 130. By way of example, but not limitation, first call time information 150 may include call times accumulated for a day. By way of example, but not limitation, second call time information 155 may include total call times of mobile device 130.

Figure 2:
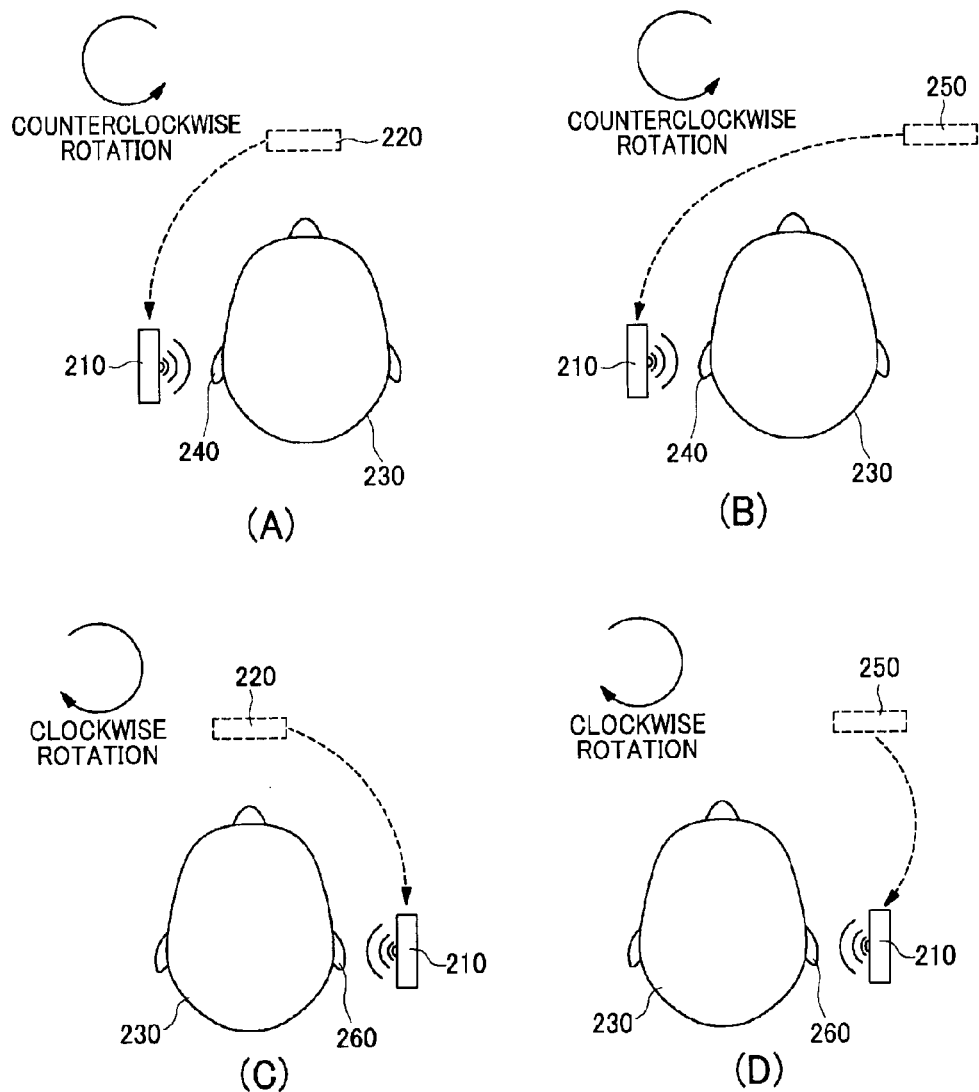
FIG. 2 shows an illustrative example in which a mobile device identifies which ear is used for a call by the mobile device by sensing rotation of the mobile device.

FIG. 2 shows an illustrative example in which a mobile device identifies which ear is used for a call by the mobile device by sensing rotation of the mobile device in accordance with at least some embodiments described herein.

In cases where a mobile device 210 receives a call request at a position 220 corresponding to a center of a user 230 and user 230 moves mobile device 210 to his/her left ear 240 for a call, as depicted in FIG. 2(A), mobile device 210 may rotate counterclockwise. In cases where mobile device 210 receives a call request at a position 250 out of the center of user 230 and user 230 moves mobile device 210 to left ear 240 for a call, as depicted in FIG. 2(B), mobile device 210 may also rotate counterclockwise. That is, mobile device 210 may rotate counterclockwise regardless of the position of receiving a call request, if user 230 moves mobile device 210 to left ear 240.

On the other hand, in cases where mobile device 210 receives a call request at position 220 corresponding to the center of user 230 and user 230 moves mobile device 210 to his/her right ear 260 for a call, as depicted in FIG. 2(C), mobile device 210 may rotate clockwise. In cases where mobile device 210 receives a call request at position 250 out of the center of user 230 and user 230 moves mobile device 210 to right ear 260 for a call, as depicted in FIG. 2(D), mobile device 210 may also rotate clockwise. That is, mobile device 210 may rotate clockwise regardless of the position of receiving a call request, if user 230 moves mobile device 210 to right ear 260.

Thus, mobile device 210 may identify which ear is used for a call based on rotation of mobile device 210. In some embodiments, a usage recommendation component included in a mobile device may identify which ear is used for a call based on rotation of the mobile device.

Figure 3:
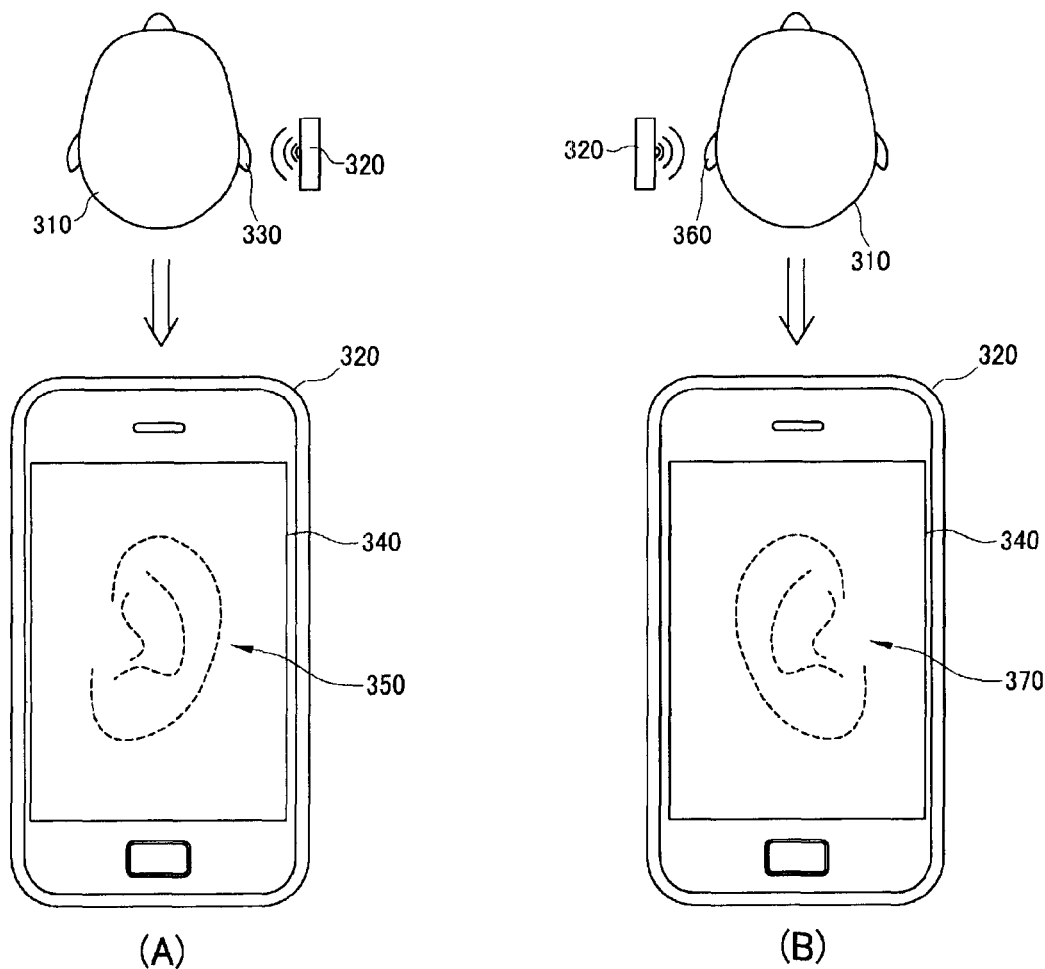
FIG. 3 shows an illustrative example in which a mobile device identifies which ear is used for a call by the mobile device by sensing a pattern of an ear touching the mobile device.

FIG. 3 shows an illustrative example in which a mobile device identifies which ear is used for a call by the mobile device by sensing a pattern of an ear touching the mobile device in accordance with at least some embodiments described herein. In cases where a user 310 brings a mobile device 320 into contact with his/her right ear 330 for a call, and thus right ear 330 touches mobile device 320, touch screen 340 of mobile device 320 may sense a pattern 350 of right ear 330 as depicted in FIG. 3(A). In cases where user 310 brings mobile device 320 into contact with his/her left ear 360 for a call, and thus left ear 360 touches mobile device 320, touch screen 340 of mobile device 320 may sense a pattern 370 of left ear 360 as depicted in FIG. 3(B). Thus, mobile device 320 may identify which ear is used for a call based on a pattern sensed by touch screen 340 of mobile device 320. In some embodiments, a usage recommendation component included in a mobile device may identify which ear is used for a call based on a pattern sensed by a touch screen of the mobile device.

Figure 4:
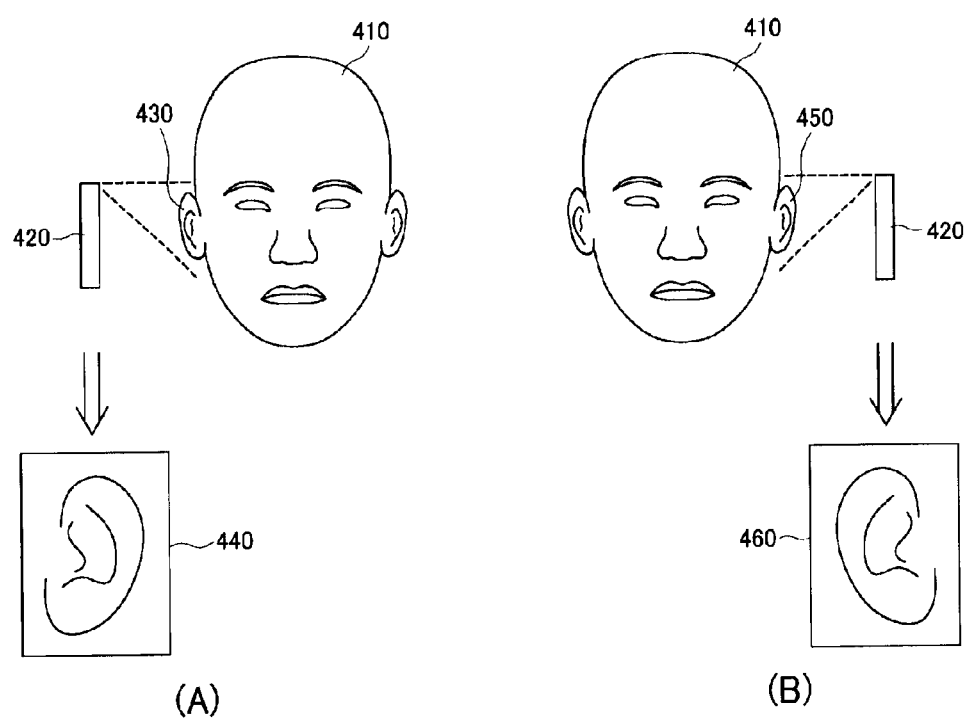
FIG. 4 shows an illustrative example in which a mobile device identifies which ear is used for a call by the mobile device by capturing an image of an ear used for a call.

FIG. 4 shows an illustrative example in which a mobile device identifies which ear is used for a call by the mobile device by capturing an image of an ear used for a call in accordance with at least some embodiments described herein. As depicted in FIG. 4(A), a user 410 may move a mobile device 420 to a right ear 430 for a call. In such cases, mobile device 420 may capture an image 440 of right ear 430. By way of example, but not limitation, a proximity sensor (not shown) of mobile device 420 may sense approaching right ear 430 of user 410, and a camera (not shown) of mobile device 420 may capture image 440 of right ear 430. As depicted in FIG. 4(B), user 410 may move mobile device 420 to a left ear 450 for a call. In such cases, mobile device 420 may capture an image 460 of left ear 450. By way of example, but not limitation, the proximity sensor (not shown) may sense approaching left ear 450 of user 410, and the camera (not shown) may capture image 460 of left ear 450. Thus, mobile device 420 may identify which ear is used for a call based on image 440 of right ear 430 or image 460 of left ear 450 of user 410 captured by the camera of mobile device 420. In some embodiments, a usage recommendation component included in a mobile device may identify which ear is used for a call based on an image of a right ear or a left ear of a user captured by a camera of the mobile device.

Figure 5:
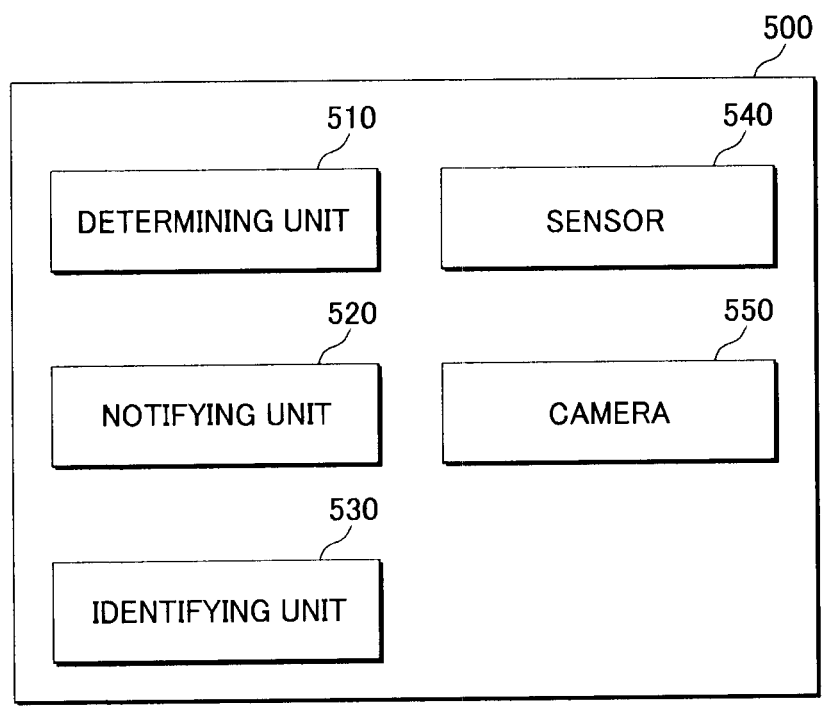
FIG. 5 shows a schematic block diagram illustrating an example of a usage recommendation component for a mobile device.

FIG. 5 shows a schematic block diagram illustrating an example of a usage recommendation component for a mobile device in accordance with at least some embodiments described herein. A usage recommendation component 500 may include a determining unit 510, a notifying unit 520, an identifying unit 530, a sensor 540 and a camera 550. Although illustrated as discrete components, various components may be divided into additional components, combined into fewer components, or eliminated, depending on the desired implementation.

Determining unit 510 may be configured to determine whether to recommend a user of the mobile device to use a right ear or a left ear based at least in part on usage information of the right ear and the left ear. In some embodiments, the usage information of the right ear and the left ear is associated with a call time of the right ear and a call time of the left ear, respectively. By way of example, but not limitation, the usage information may include a total call time of the right ear and a total call time of the left ear by the mobile device. In some embodiments, the usage information may include a call time of the right ear and a call time of the left ear for predetermined period by the mobile device, for example a day.

In some embodiments, the usage information may be associated with continuity of a call. By way of example, but not limitation, the usage information may include only one call time by the mobile device. The usage information may not just indicate a total accumulated call time but may also include information on time taken for each call, for example whether a call lasted for 5 minutes or 1 hour.

In some embodiments, the usage information may be associated with strength of signal of the mobile device for a call. By way of example, but not limitation, the usage information may include a signal strength information recorded when each call is made. The strength of the signal of the mobile device for a call may be changed according to communication environment of the mobile device. A risk of radiation from a mobile device may vary depending on the strength of signal of the mobile device for a call. If the mobile device is in a bad communication environment, the strength of signal of the mobile device for a call may increase, and accordingly the risk of radiation from the mobile device may also increase. On the other hand, if the mobile device is in a good communication environment, the strength of signal of the mobile device for a call may decrease, and accordingly the risk of radiation of the mobile device may also decrease.

Notifying unit 520 may be configured to notify a user of its determination of whether to use the right ear or the left ear to the user. In some embodiments, notifying unit 520 may produce an output image of the determination. The output image may include usage direction information to recommend using a right ear or a left ear, and/or call time information of the mobile device by the right ear and the left ear of the user, respectively. The call time information may include at least one of call time of the mobile device during a predetermined period and total call time of the mobile device. Since the output image may provide the user with call time information of the mobile device as well as the usage direction of the mobile device, the user may identify which ear to use when using the mobile device in order to equalize the amount of time spent on the right ear and the left ear.

Identifying unit 530 may be configured to identify which ear is used for a call with the mobile device, for example the right ear or the left ear of the user. In some embodiment, identifying unit 530, aided by sensor 540, may identify which ear is used for a call based on rotation of the mobile device. By way of example, but not limitation, if sensor 540 senses counterclockwise rotation of the mobile device, identifying unit 530 may identify the left ear as the ear used for the call. If sensor 540 senses clockwise rotation of the mobile device, identifying unit 530 may identify the right ear as the ear used for the call.

In some embodiments, identifying unit 530 may identify which ear is used for a call based on a pattern of an ear touching the mobile device. By way of example, but not limitation, if user contacts the mobile device with the right ear or the left ear, sensor 540 may sense a pattern of an ear touching the mobile device, for example, using a touch screen of the mobile device. A pattern of the right ear and a pattern of the left ear are distinguishable, and thus, identifying unit 530 may identify the ear used for the call based on the pattern of the ear touching the mobile device.

In some embodiments, identifying unit 530 may identify the ear used for the call based on an image of the ear captured by camera 550. By way of example, but not limitation, if the user moves the mobile device to the right ear or the left ear for a call, sensor 540 may sense the mobile device that approaches the right ear or the left ear of the user, and may transmit an image capturing signal to camera 550. Camera 550 may capture an image of an ear of the user approaching the mobile device. Identifying unit 530 may obtain a pattern of the ear of the user by analyzing the image captured by camera 550, and identify which ear is used for the call based on the obtained pattern.

Sensor 540 may be configured to sense rotation of the mobile device or a pattern of an ear touching the mobile device. In some embodiments, sensor 540 may include an inertial sensor, a gyroscope sensor, an accelerometer sensor, a touch sensor and/or a proximity sensor. In some embodiments, sensor 540 may sense rotation of the mobile device, and provide identifying unit 530 with the sensed rotation. In some embodiments, sensor 540 may sense a pattern of an ear touching the mobile device, and provide identifying unit 530 with the sensed pattern. In some embodiments, sensor 540 may sense the mobile device that approaches an ear of a user, and inform camera 550 that the mobile device approaches the ear of the user.

Camera 550 may be configured to capture an image of an ear used for a call by the mobile device. In some embodiments, camera 550 may capture an image of an ear approaching the mobile device, and provide identifying unit 530 with the captured image.

Figure 6:
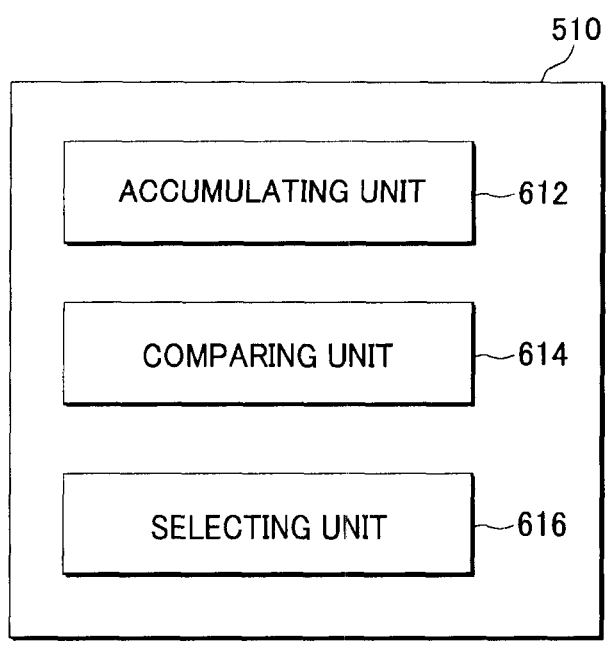
FIG. 6 shows a schematic block diagram illustrating an example of a determining unit.

FIG. 6 shows a schematic block diagram illustrating an example of determining unit 510 in accordance with at least some embodiments described herein. Determining unit 510 may include an accumulating unit 612, a comparing unit 614 and a selecting unit 616. Although illustrated as discrete components, various components may be divided into additional components, combined into fewer components, or eliminated, depending on the desired implementation.

Accumulating unit 612 may be configured to accumulate the call times of the right ear and the left ear, respectively. In some embodiments, accumulating unit 612 may store call times of a mobile device by a right ear and a left ear. Accumulating unit 612 may receive information on which ear is used for a call from identifying unit 530, and store the call times for the ear. In some embodiments, accumulating unit 612 may accumulate call time by a predetermined period, for example 24 hours.

Comparing unit 614 may be configured to compare the accumulated call times of the right ear and the left ear. In some embodiments, comparing unit 614 may compare the accumulated call times of the right ear and the accumulated call times of the left ear, to determine which one of the accumulated call times of the right ear and the accumulated call times of the left ear is larger.

Selecting unit 616 may be configured to select one of the right ear or the left ear based at least in part on the compared call times. In some embodiments, selecting unit 616 may select which ear to recommend to a user based on the result of comparing by comparing unit 614. By way of example, but not limitation, if the accumulated call times of the right ear are larger than the accumulated call times of the left ear, selecting unit 616 may select the left ear to recommend for a call.

Figure 7:
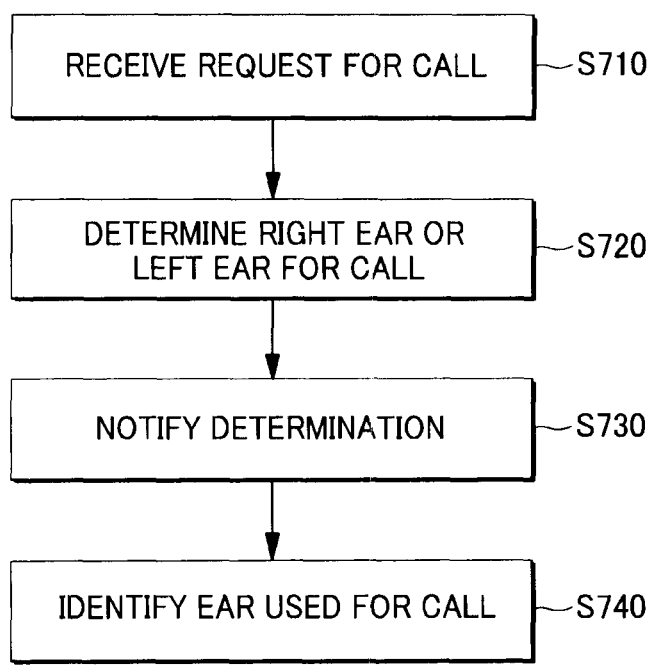
FIG. 7 shows a flow diagram illustrating an example of a process for determining an ear for a call and identifying an ear used for a call.

FIG. 7 shows a flow diagram illustrating an example of a process for determining an ear for a call and identifying an ear used for a call in accordance with at least some embodiments described herein. The method in FIG. 7 can be implemented using a mobile device featuring a usage recommendation component 500 which includes determining unit 510, notifying unit 520, identifying unit 530, sensor 540 and camera 550 as described above. An example process may include one or more operations, actions, or functions as illustrated by one or more blocks S710, S720, S730 and/or S740. Although illustrated as discrete blocks, various blocks may be divided into additional blocks, combined into fewer blocks, or eliminated, depending on the desired implementation. Processing may begin at block S710.

At block S710, the mobile device may receive a request signal for a call. In some embodiments, the mobile device may receive the request signal from an external device or a server. Processing may continue from block S710 to block S720.

At block S720, the mobile device may determine whether to recommend a user of the mobile device to use a right ear or a left ear based at least in part on usage information of the right ear and the left ear. In some embodiments, the usage information of the right ear and the left ear may include a call time of the right ear and a call time of the left ear, respectively. In addition, the usage information may include at least one of continuity of a call and strength of signal of the mobile device for a call. Processing may continue from block S720 to block S730.

At block S730, the mobile device may notify the user of its determination of whether to use the right ear or the left ear. In some embodiments, the mobile device may display an output image indicating the determination. The output image may present information on which direction to use, either the right ear or the left ear of the user and/or call time information of the right ear and the left ear of the user. Processing may continue from block S730 to block S740.

At block S740, the mobile device may identify which ear is used for a call. In some embodiments, the mobile device may sense rotation of the mobile device, and then determine which ear is used for the call based at least in part on the sensed rotation. By way of example, but not limitation, if the mobile device detects counterclockwise rotation of the mobile device, the mobile device may determine the left ear of the user as the ear used for the call. On the other hand, if the mobile device detects clockwise rotation of the mobile device, the mobile device may determine the right ear of the user as the ear used for the call.

In some embodiments, the mobile device may sense a pattern of an ear touching the mobile device, and then determine which ear is used for the call based at least in part on the sensed pattern. By way of example, but not limitation, the mobile device may sense the pattern of an ear contacting with a touch screen of the mobile device, and determine which ear is used for the call by analyzing the detected pattern.

In some embodiments, the mobile device may capture an image of an ear used for the call, and then determine which ear is used for the call based at least in part on the captured image. By way of example, but not limitation, the mobile device may capture an image of an ear approaching the mobile device by a camera of the mobile device, identify a pattern of the ear approaching the mobile device by analyzing the captured image, and determine which ear is used for the call by analyzing the identified pattern.

Although FIG. 7 illustrates that blocks S720 to S740 are performed when the mobile device receives the request for call from another device or a server, it is noted that these blocks are also performed when the mobile device generates a request for a call and sends it to the other device or the server.

Figure 8:
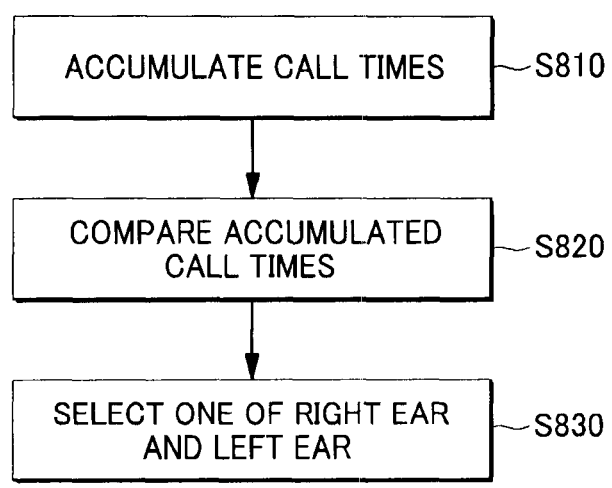
FIG. 8 shows an example of a flow diagram illustrating a process for determining a right ear or a left ear for a call.

FIG. 8 shows a flow diagram illustrating an example of a process for determining a right ear or a left ear for a call in accordance with at least some embodiments described herein. The method in FIG. 7 can be implemented using a mobile device featuring a usage recommendation component 500 which includes accumulating unit 612, comparing unit 614 and selecting unit 616 as described above. An example process may include one or more operations, actions, or functions as illustrated by one or more blocks S810, S820 and/or S830. Although illustrated as discrete blocks, various blocks may be divided into additional blocks, combined into fewer blocks, or eliminated, depending on the desired implementation. Processing may begin at block S810.

At block S810, the mobile device may accumulate call times of the right ear and the left ear, respectively. In some embodiments, the mobile device may accumulate call times of the mobile device by a right ear and a left ear, and store the accumulated call times by the right ear and the left ear. In some embodiments, the mobile device may accumulate the call times by predetermined period. Processing may continue from block S810 to block S820.

At block S820, the mobile device may compare the accumulated call times of the right ear and the left ear with each other. In some embodiments, the mobile device may determine which one of the accumulated call times of the right ear and the accumulated call times of the left ear is larger by comparing the accumulated call times of the right ear and the accumulated call times of the left ear. Processing may continue from block S820 to block S830.

At block S830, the mobile device may select one of the right ear and the left ear based at least in part on the result of comparing. In some embodiment, the mobile device may select an ear with a smaller accumulated call time, i.e., an ear less exposed to calls, based on the comparing at block S820.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
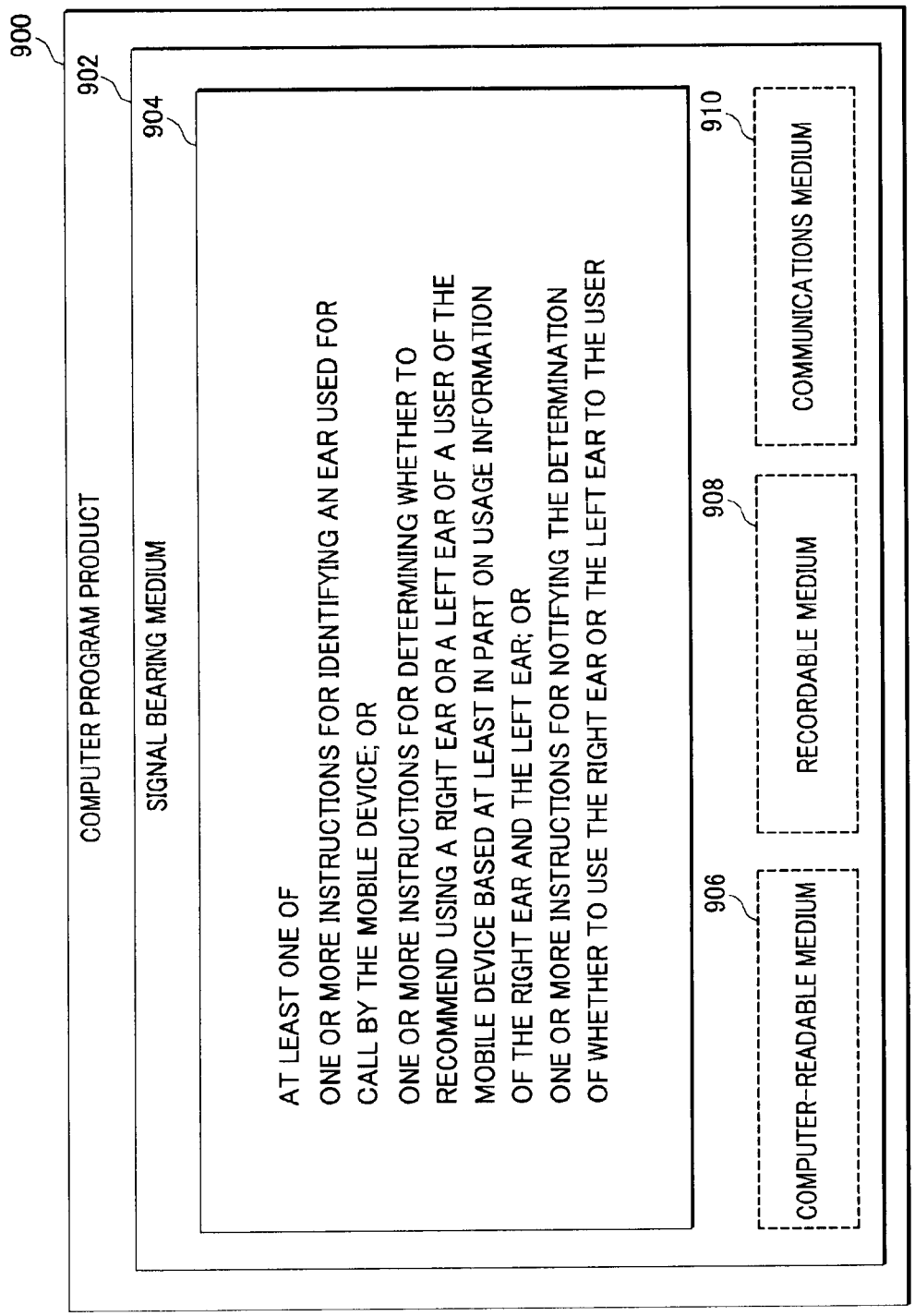
FIG. 9 illustrates computer program products that can be utilized to provide a usage recommendation scheme for a call.

FIG. 9 illustrates computer program products 900 that can be utilized to provide a usage recommendation scheme for a call in accordance with at least some embodiments described herein. Program product 900 may include a signal bearing medium 902. Signal bearing medium 902 may include one or more instructions 904 that, when executed by, for example, a processor, may provide the functionality described above with respect to FIGS. 1-8. By way of example, instructions 904 may include: one or more instructions for identifying an ear used for a call by the mobile device; one or more instructions for determining whether to recommend using a right ear or a left ear of a user of the mobile device based at least in part on usage information of the right ear and the left ear; one or more instructions for notifying the determination of whether to use the right ear or the left ear to the user. Thus, for example, referring to FIG. 5, recommendation component 500 may undertake one or more of the blocks shown in FIG. 7 in response to instructions 904.

In some implementations, signal bearing medium 902 may encompass a computer-readable medium 906, such as, but not limited to, a hard disk drive, a CD, a DVD, a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of recommendation component 500 by an RF signal bearing medium 902, where the signal bearing medium 902 is conveyed by a wireless communications medium 910 (e.g., a wireless communications medium conforming with the IEEE 802.11 standard).

Figure 10:
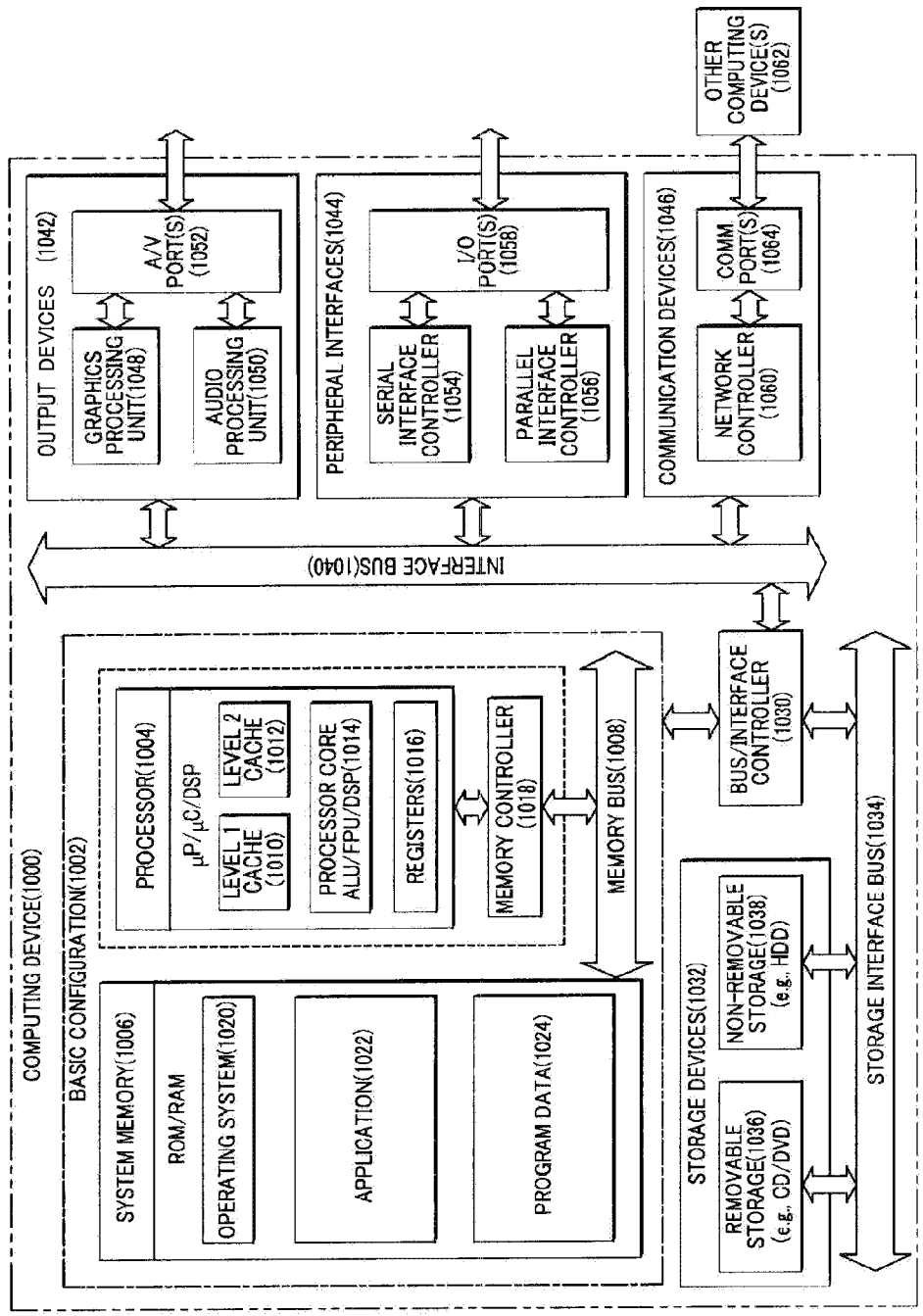
FIG. 10 is a block diagram illustrating an example of a computing device that can be utilized to provide a usage recommendation scheme for a call.

FIG. 10 is a block diagram illustrating an example of a computing device 1000 that can be utilized to provide a usage recommendation scheme for a call in accordance with at least some embodiments described herein. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof System memory 1006 may include an operating system 1020, one or more applications 1022, and program data 1024.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a mobile device, comprising:
    prior to a user using the mobile device for a call, determining, by the mobile device, whether to recommend using a right ear or a left ear of the user for the call based at least in part on usage information of the right ear and the left ear; and
    notifying, by the mobile device, the determination of whether to use the right ear or the left ear to the user.

2. The method of claim 1, wherein the usage information of the right ear and the left ear is associated with a call time of the right ear and a call time of the left ear, respectively.

3. The method of claim 2, wherein the determining includes:
    accumulating the call times of the right ear and the left ear, respectively.

4. The method of claim 3, wherein the determining further includes:
    comparing the accumulated call times of the right ear and the left ear with each other; and
    selecting one of the right ear and the left ear based at least in part on the comparing.

5. The method of claim 2, wherein the usage information is associated with at least one of continuity of a call and strength of signal of the mobile device for a call.

6. The method of claim 1, further comprising:
    identifying an ear used for a call by the mobile device.

7. The method of claim 6, wherein the identifying includes:
    sensing rotation of the mobile device; and
    determining a type of the ear used for the call based at least in part on the sensed rotation.

8. The method of claim 6, wherein the identifying includes:
    sensing a pattern of an ear touching the mobile device; and
    determining a type of the ear used for the call based at least in part on the sensed pattern.

9. The method of claim 8, wherein the ear is sensed by a touch screen of the mobile device.

10. The method of claim 6, wherein the identifying includes:
    capturing an image of an ear used for the call; and
    determining a type of the ear used for the call based at least in part on the captured image.

11. The method of claim 6, wherein the identifying includes:
    sensing a hand gripping the mobile device; and
    determining a type of an ear used for the call based at least in part on a type of the sensed hand.

12. The method of claim 1, wherein the notifying includes:
    outputting an output image of the determination.

13. The method of claim 12, wherein the output image is associated with call time information of the mobile device by the right ear and the left ear of the user, respectively.

14. The method of claim 13, wherein the call time information is associated with total call time of the mobile device.

15. The method of claim 13, wherein the call time information is associated with call time of the mobile device during a predetermined period.

16. A usage recommendation component for a mobile device, comprising:
- a determining unit configured to determine, prior to a user using the mobile device for a call, whether to recommend using a right ear or a left ear of the user of the mobile device based at least in part on usage information of the right ear and the left ear; and
- a notifying unit configured to notify the determination of whether to use the right ear or the left ear to the user.

17. The usage recommendation component of claim 16, wherein the usage information of the right ear and the left ear is associated with a call time of the right ear and a call time of the left ear, respectively.

18. The usage recommendation component of claim 17, wherein the determining unit includes:
- an accumulating unit configured to accumulate the call times of the right ear and the left ear, respectively.

19. The usage recommendation component of claim 18, wherein the determining unit includes:
- a comparing unit configured to compare the accumulated call times of the right ear and the left ear with each other; and
- a selecting unit configured to select one of the right ear and the left ear based at least in part on the compared call times.

20. The usage recommendation component of claim 16, wherein the usage information is associated with at least one of continuity of a call and strength of signal of the mobile device for a call.

21. The usage recommendation component of claim 16, further comprising:
- an identifying unit configured to identify an ear used for a call by the mobile device.

22. The usage recommendation component of claim 21, wherein the identifying unit includes:
- a rotation sensing unit configured to sense rotation of the mobile device; and
wherein the identifying unit is further configured to identify the ear used for the call based at least in part on the sensed rotation.

23. The usage recommendation component of claim 21, wherein the identifying unit includes:
- a touch sensing unit configured to sense a pattern of an ear touching the mobile device; and
wherein the identifying unit is further configured to identify the ear used for the call based at least in part on the pattern.

24. The usage recommendation component of claim 21, wherein the identifying unit includes:
- an image capturing unit configured to capture an image of the ear used for the call; and
wherein the identifying unit is further configured to identify the ear used for the call based at least in part on the captured image.

25. The usage recommendation component of claim 16, wherein the notifying unit is further configured to output an output image of the determination.

26. A non-transitory computer-readable storage medium having stored thereon computer-executable instructions that, in response to execution, cause a usage recommendation component for a mobile device to perform operations, comprising:
- identifying an ear used for a call by the mobile device prior to a user using the mobile device for the call;
- determining whether to recommend using a right ear or a left ear of the user based at least in part on usage information of the right ear and the left ear; and
- notifying the determination of whether to use the right ear or the left ear to the user prior to the user using the mobile device for the call.

27. The non-transitory computer-readable storage medium of claim 26, wherein the usage information of the right ear and the left ear is associated with a call time of the right ear and a call time of the left ear, respectively.

28. The non-transitory computer-readable storage medium of claim 27, wherein the determining includes:
- accumulating the call times of the right ear and the left ear, respectively;
- comparing the accumulated call time of the right ear and the left ear, respectively; and
- selecting one of the right ear and the left ear based at least in part on the comparing.

29. The non-transitory computer-readable storage medium of claim 26, wherein the identifying includes:
- sensing rotation of the mobile device; and
- determining a type of the ear used for the call based at least in part on the sensed rotation.

30. The non-transitory computer-readable storage medium of claim 26, wherein the identifying includes:
- sensing a pattern of an ear touching the mobile device; and
- determining a type of the ear used for the call based at least in part on the sensed pattern.

* * * * *